Jan. 3, 1933.  C. G. TRIMBACH  1,892,914
MACHINE GUN MOUNT FOR AIRCRAFT
Filed March 27, 1930   2 Sheets-Sheet 1
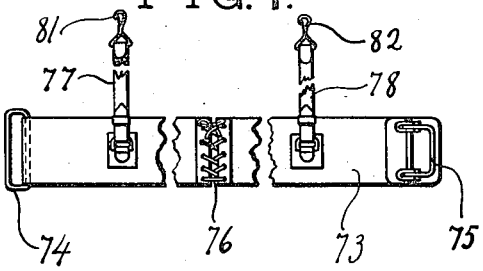
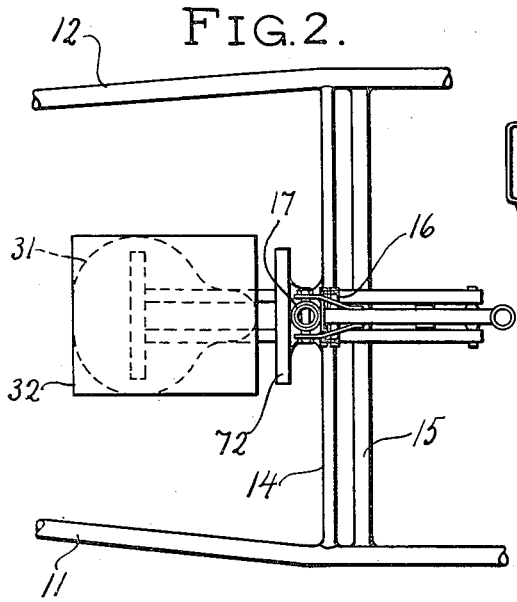
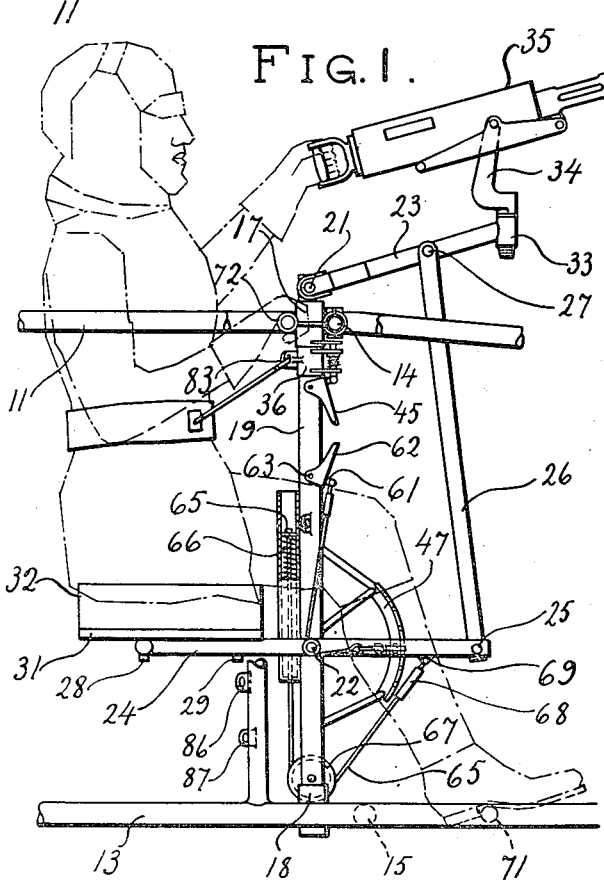
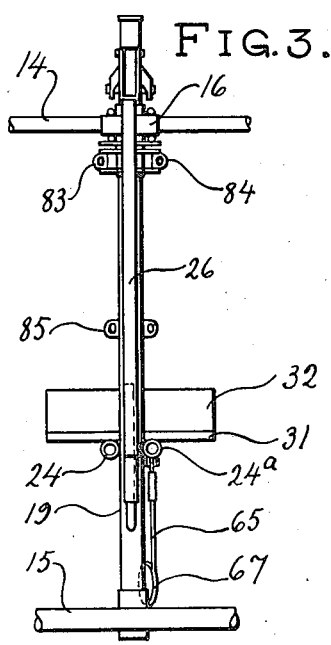
INVENTOR
CLEM G. TRIMBACH
BY
ATTORNEY

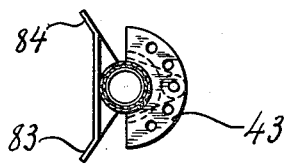
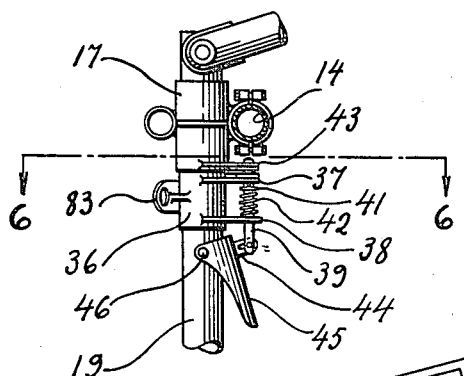
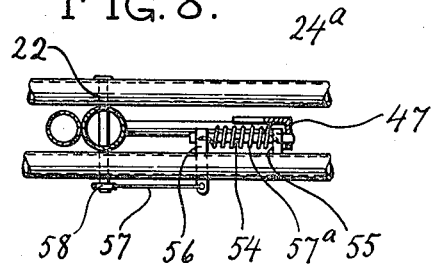
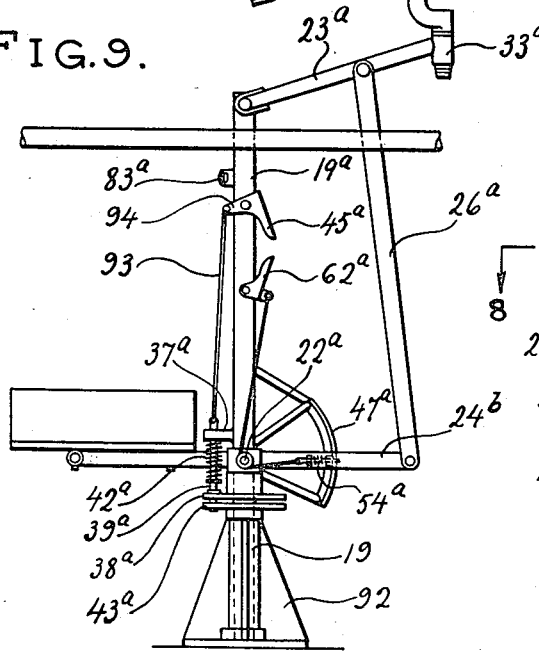
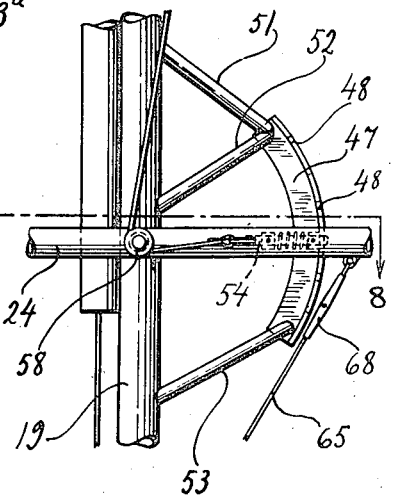

Patented Jan. 3, 1933

1,892,914

UNITED STATES PATENT OFFICE

CLEM G. TRIMBACH, OF HEMPSTEAD, NEW YORK, ASSIGNOR TO CURTISS AEROPLANE & MOTOR COMPANY, INC., A CORPORATION OF NEW YORK

MACHINE GUN MOUNT FOR AIRCRAFT

Application filed March 27, 1930. Serial No. 439,298.

This invention relates to military aeronautics and more particularly to a mount for a machine gun to be used in an airplane.

Prior to my invention the usual form of mount for machine guns for airplanes was that which is known as the "ring mount." The ring mount is subject to many well known disadvantages. For instance, it must be very carefully maintained against any bending of the parts thereof in order to obviate a distortion of the exact circle of the two cooperating parts and consequent jamming or binding of the mount. The necessity of this precaution makes it very difficult to get in and out of the cockpit of the airplane and even with all possible precaution in its operation, some bending frequently occurs. Moreover, the shape of the opening in the cockpit and the arrangement of the gun makes it necessary that a large part of the gunner is directly exposed to the fire of the enemy. The rotation of the gun except when the mount is lowered to its depressed position is very difficult. The mount is very heavy and consequently adds to the weight of the military load of the airplane. It is difficult to install upon or remove from an airplane and in general is very much disliked by observers who have to use the rear gun of a fighting airplane.

One of the objects of my invention is to provide a mount for a machine gun for an airplane which can be easily manipulated by the gunner.

A further object is to insure that the gunner's seat shall always be correspondingly moved with movement of the gun so that his position will always be convenient for aiming and firing the gun.

A further object of my invention is to decrease the weight of machine gun mounts for an airplane.

A further object is to provide a mount for a machine gun which shall be capable of free movement without binding.

A further object is to retain an adequate range of fire of a mount for a machine gun not only with regard to transverse fire, but also with regard to elevation and depression.

Further objects include the provision of means for balancing the machine gun, locks for maintaining the machine gun rigidly in any selected position, and a suitable back rest for the operator of the gun.

A further object of the invention is to simplify and make more easy the installation and removal of the machine gun mount from the cockpit of an airplane.

A further object is to reduce the required size of the cockpit opening in order to give the gunner more protection from the enemy fire.

Further objects will be apparent from a reading of the subjoined specification and claims and from a consideration of the drawings.

In order to explain the invention more clearly, one embodiment thereof is shown in the accompanying drawings, in which:

Fig. 1 is a side elevation of a part of an airplane equipped with a machine gun mount constructed according to my invention;

Fig. 2 is a plan view of the apparatus disclosed in Fig. 1;

Fig. 3 is a front elevation of the apparatus shown in Fig. 1;

Fig. 4 is a detail view of the belt which is used to provide a back rest for the gunner;

Fig. 5 is an enlarged elevation of a part of the apparatus illustrating in detail the transverse lock;

Fig. 6 is a vertical sectional view of the detail shown in Fig. 5 taken substantially on the line 6—6;

Fig. 7 is an elevation on an enlarged scale showing in detail the construction of the elevation and depression lock;

Fig. 8 is a horizontal section of the detail shown in Fig. 7 taken substantially on the line 8—8; and Fig. 9 is a side elevation of a modified form of a machine gun mount for an airplane also constructed according to my invention.

In order to illustrate my invention I have shown a portion of an airplane fuselage or body constructed with longérons such as the longérons 11, 12 and 13 and with horizontal struts connecting these longérons such as the struts 14 and 15. Vertical connecting struts may also be provided. Securely fastened to the upper horizontal strut 14 as by means of the bracket 16 is a bearing 17 and secured to the floor of the fuselage is a similar bearing 18. Carried in these bearings for rotation about a substantial vertical axis is a post 19. The post carries at vertically spaced points a pair of axis pins 21 and 22. On the first of these axis pins is pivoted the lever 23, and on the second a pair of levers 24 and 24ª, all of the levers being mounted on the pins for pivotal movement about the axes of the pins which axes are substantially perpendicular to the axis of the post 19. The rearward ends of the levers 24 and 24ª are pivotally connected as by the pin 25 to a link 26. The opposite end of the link 26 is pivotally connected as by the pin 27 to an intermediate point on the lever 23. The opposite end of the lever 24 from the axis pin 25 has securely fastened thereto as at 28 and 29 a gunner's seat 31 facing toward the tail of the airplane. The gunner's seat may be of the shape indicated more clearly in Fig. 2 and a seat pack parachute 32 may be utilized to provide a seat in the nature of a cushion for the gunner. The opposite end of the lever 23 from the pivot pin 21 is provided with a tubular member 33 into which the adapter 34 for the machine gun 35 is arranged to fit and be secured. Thus, it will be noted that the mount 33 and the machine gun 35 may be elevated or depressed by movement of the frame including the members 23, 24 and 26 about the pivots 21 and 22 and that also the mount 33 and the gun 35 may be moved for transverse fire by rotation of the post 19 in the bearings 17 and 18. It will also be noted that the movement of the gun is synchronized with the movement of the gunner's seat and consequently the gunner is always positioned directly behind the gun so that he may most conveniently operate the gun in aiming and firing.

Easily releasable locks are provided for maintaining the gun and gunner's seat securely in any selected position. As shown more clearly in Fig. 5 the post 19 is provided with a tubular bracket 36. Protruding forward from the bracket 36 are a pair of parallel plates 37 and 38. Both of these plates are provided with holes through which protrude a plunger 39 having a collar 41. Inserted around the plunger 39 and between the collar 41 and the plate 38 is a compression spring 42 by which the plunger is constantly urged upward through the holes in the plates 37 and 38. Secured to the bearing 17 is a quadrant 43 provided with a plurality of spaced holes which are shown more clearly in Fig. 6. As the plunger 39 is urged upward by the spring 42, it is adapted to enter any selected one of the holes in the quadrant 43 and thus to secure the post 19 against any further rotation about its vertical axis. The lower end of the plunger 39 is fastened as by a pin and slot connection to a lug 44 formed on a hand grip 45 which is pivoted on the post 19 as at 46. Thus, the hand grip 45 forms in effect a bell crank lever by which the plunger 39 may be depressed and withdrawn from any one of the holes in the quadrant 43. When the plunger is thus depressed by the hand grip 45 the post 19 becomes free to rotate in the bearings 17 and 18 and the mount 33 and gun 35 may be moved to any desired transverse position. Such movement is accomplished not by a manual movement of the gun itself, but by a movement of the seat upon which the gunner is resting, which is easily accomplished by a swinging of his body.

The lock against undesired elevation and depression is somewhat similar to the above described transverse lock. An arcuate plate such as the plate 47 is secured to the post 19 as by brackets 51, 52 and 53. This arcuate plate 47 is provided with a plurality of spaced holes such as the holes 48 into any one of which a plunger such as the plunger 54 is adapted at times to be urged. The plunger is mounted for transverse sliding movement in a lug 55 secured to the inner side of the lever 24. The end of the plunger 54 which is opposite the nose is secured to an offset arm 56 and a cable 57 is also attached to the arm for the purpose of, at times, pulling the plunger 54 out of the holes in the arcuate plate 47. Surrounding the plunger 54 and attached to the lug 55 and to the arm 56 is a tension spring 57ª by which the plunger 54 is continuously urged to enter one of the holes in the arcuate plate 47. The cable 57 passes rearwardly of the mount around a pulley 58 mounted on the pin 22. The cable then passes upward and is connected to a lug 61 formed on a hand grip 62 pivoted on the shaft 19 as at 63. The hand grip 62 forms in effect a bell crank lever and upon movement thereof toward the post 19 the plunger 54 is withdrawn against the action of the spring 57ª from one of the holes in the arcuate plate 47 so that the mount 33 and the machine gun 35 may be raised or lowered as desired. Upon release of the grip 62 the spring 57ª causes the plunger to enter the selected one of the holes in the plate 47 and thus securely to fix the machine gun mount against further undesired elevation or depression. It is to be noted that the elevation and depression of the machine gun and mount does not require manual effort, but is accomplished by the raising or lowering of the seat of the gunner. The grips 45 and 62 are positioned adjacent to each other so that both may be operated with one hand if desired.

The weight of the gunner is ordinarily greater than that of the machine gun. Therefore, I provide means to partially counter-balance this excess in weight so that the gunner may more easily raise the seat to lower the gun. Secured to one side of the post 19 is a cylinder 64 carrying interiorly thereof a loosely fitting washer 65. Inserted beneath the washer 65 and bearing on the bottom of the cylinder 64 is a compression spring 66 which constantly urges the washer 65' upward. Secured to the washer and passing downward through the spring and through the bottom of the cylinder 64 is a cable 65 which is secured as by a turnbuckle 68 to a lug 69 formed on one of the levers 24 or 24$^a$. The cable 65 passes downward from the cylinder 64, around a pulley 67 and then upward to join the turnbuckle 68. Thus, the spring 66, through the cable 65, constantly urges the rearward ends of the levers 24 and 24$^a$ downward, and thus tends to raise the seat 31 and the gunner seated thereon.

Several additional features are provided for the comfort and convenience of the gunner. For instance, a transverse strut 71 is provided and extends substantially transversely of the lower part of the fuselage to provide a foot rest for him. A short tubular rod 72 which may be seen best in Fig. 2 is provided adjacent to the bearing 17 to be used as a back rest while riding forward and by which he may steady himself while firing the gun and/or while moving the gun mount. A belt is provided which forms a back rest and safety belt for the gunner while he is operating the gun. This belt is shown most clearly in Fig. 4 and is provided with a wide web 73, a safety catch formed of the elements 74 and 75, a lace 76 and a pair of adjustable supporting straps 77 and 78. The ends of the straps 77 and 78 are provided with snap catches 81 and 82, by which they may be secured in holes formed in any pair of several sets of lugs. As shown in the drawings, the straps are secured to the pair of lugs 83 and 84. This pair of lugs is secured to the post 19 and rotate with the said post. Similarly, a pair of lugs, one of which is shown at 85, is also mounted to turn with the post 19. A third and fourth pair of lugs is provided and secured to vertical struts. One of each of these pairs of lugs may be seen at 86 and 87.

I have shown a modified form of my invention in Fig. 9. Therein, the post 19$^a$ which corresponds to the post 19 shown in Fig. 1, instead of being mounted in bearings 17 and 18, is mounted in a single bearing 91 at its lower end. The bearing 91 is formed in a bracket 92 which is securely fastened to the floor of the fuselage. The lock by which undesired transverse movement of the gun mount is obviated is positioned adjacent to the bearing 91 instead of being positioned at the upper end of the post 19$^a$. This lock is formed by a plunger 39$^a$ mounted for substantially vertical sliding movement in holes in a lug 37$^a$ and in a plate 38$^a$. The plunger is continually urged downward by a spring 42$^a$ and is thus urged to pass through any selected one of a plurality of holes formed in the circumference of a circular plate 43$^a$. The upper end of the plunger 39$^a$ is secured to a cable 93 which passes upward and is connected at its upper end to an offset arm 94 of the hand grip 45$^a$. The hand grip 45$^a$ is positioned adjacent to the hand grip 62$^a$, so that both grips may be operated simultaneously by one hand of the operator if desired, or either may be separately operated. Compression of the hand grip 45$^a$ lifts the arm 94 and withdraws the plunger 39$^a$ from one of the holes in the circular disk 43$^a$. Thus, the amount 33$^a$ of the machine gun 35$^a$ may be rotated throughout 360° of travel of transverse fire. On compression of the hand grip 62$^a$ the plunger 54$^a$ may be withdrawn from the arcuate plate 47$^a$ and the amount 33$^a$ elevated or depressed through the frame formed by the levers 23$^a$, 24$^b$ and the link 26$^a$.

It is thought that the operation of my improved machine gun mount will be clear from the above description. The gunner, while seated upon the seat 31, may ride either forward or backward with the ends of the straps 77 and 78 fastened to the pairs of lugs including the lugs 86 and 87, respectively. When an occasion arises in which it is necessary to use the machine gun he quickly unsnaps the catches 81 and 82 and fastens them either in the pair of lugs 83 and 84 or the pair which includes the lug 85. Then he compresses either the handle 45 or the handle 62 or both of the handles 45 and 62, whereupon the machine gun 35 and its mount 33 are free to be rotated for transverse fire or to be elevated or depressed for changes in the elevation of fire. The gunner accomplishes this rotation by movement of his seat and in the accomplishment of the movement of the mount at the same time positions himself exactly in the rear of the gun and in line therewith so that he can more easily and efficiently aim and operate the gun. Of course the gun is also movable about a vertical axis and about a lateral axis by reason of its mounting on the adapter 34. The mount is especially adapted for two seater pursuit ships in which the pilot is provided with guns which cover the forward range of fire and in which it is necessary that the observer protect the rear part of the ship.

The operation of the mount shown in Fig. 9 is in all respects similar to that previously described with reference to the mount shown in Fig. 1. However, the pedestal mounting on the bracket 92 allows substantially 360° of fire inasmuch as the pilot may swing entirely around the post 19$^a$, and at the same time cause the gun to swing always opposite to him around the said post. All of the pilot's weight and a large part of the weight of the machine gun is carried comparatively low on the post 19$^a$ and substantially at the pivotal point 22$^a$, so that there is very little cantilever strain upon the upper part of the post 19$^a$. If desired, there may be provided a spring similar to the spring 66 to be used with a mount of the character shown in Fig. 9 in order to partially counter-balance the weight of the gunner.

It is to be understood that the above described embodiments of my invention are for the purpose of illustration only and various changes may be made therein without departing from the spirit and scope of the invention.

I claim as my invention:

1. In a mount for a machine gun for an airplane, a lever upon which said mount is fastened, a second lever arranged to bear the weight of the gunner, a link for connecting said levers, and resilient means for partially counter-balancing the weight of the gunner.

2. A gun mount for aircraft comprising an upright, a gun carrying arm associated with the upper part of said upright and arranged for rotational movement about the longitudinal axis of said upright and also for rotational movement about a normally horizontal axis substantially perpendicular to the first named axis, an operating arm associated with the lower part of said upright and also arranged for rotational movement about the longitudinal axis of said upright and for rotational movement about a normally horizontal axis perpendicular thereto, means for moving said operating arm about said two axes, and means for transmitting the motion of the operating arm to the gun carrying arm to cause corresponding movements thereof.

3. A gun mount for aircraft comprising a normally upright member, a gun carrying arm carried thereby and mounted for rotational movement about a normally horizontal axis substantially perpendicular to the upright member, an operating arm also carried by the upright member, which said arm is also mounted for rotational movement about a normally horizontal axis substantially perpendicular to the upright member and is maintained substantially parallel to the gun carrying arm, a link connecting the two arms, and means for moving said operating arm to adjust the position of the gun carrying arm.

4. In a device for supporting a machine gun on an airplane, a mount for said machine gun, an arm upon which said mount is carried, a seat for the gunner, a common support for the arm and for the seat, means for pivotally mounting the arm upon said support on a substantially horizontal pivot, means for pivotally mounting the seat upon the support upon a pivot having an axis substantially parallel to the axis of the first named pivot, and means for connecting said arm and said seat.

5. In a device for supporting a machine gun on an airplane; a mount for said machine gun; an arm upon which said mount is carried, a seat for the gunner; a common support for said arm and said seat; means for pivotally mounting said arm upon said support; means for pivotally mounting said seat upon said support, said last named means including a lever extending on both sides beyond said pivot, and the seat being positioned on the opposite side of said support from said arm; and means connecting said arm and said lever.

6. In combination with a machine gun mount for an airplane, a seat for the gunner thereof movable with said gun mount, a back for said seat movable therewith and comprising a belt adapted to support the back of the gunner, straps fastened to said belt, and means secured to the ends of said straps for detachably securing said belt to a part of the gun mount, whereby a flexible movable support is provided for the back of the gunner which takes up substantially no space in the cockpit of the airplane.

In testimony whereof I hereunto affix my signature.

CLEM G. TRIMBACH.